(12) United States Patent
Sawanaka (10) Patent No.: US 7,120,346 B2
(45) Date of Patent: Oct. 10, 2006

(54) IMAGE PROJECTOR AND LIGHT TUNNEL

(75) Inventor: Tomohiko Sawanaka, Daito (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/921,975

(22) Filed: Aug. 20, 2004

(65) Prior Publication Data

US 2005/0078927 A1    Apr. 14, 2005

(30) Foreign Application Priority Data

Aug. 21, 2003    (JP) .............................. 2003-297909

(51) Int. Cl.
*G02B 6/00*    (2006.01)
(52) U.S. Cl. ..................................... 385/133
(58) Field of Classification Search ................. 385/133
See application file for complete search history.

(56) References Cited

U.S. PATENT DOCUMENTS

| | | | |
|---|---|---|---|
| 4,933,815 A * | 6/1990 | Parthasarathy | 362/565 |
| 6,398,368 B1 * | 6/2002 | Chen | 353/98 |
| 6,715,880 B1 | 4/2004 | Shouji | |
| 6,771,870 B1 * | 8/2004 | Strobl et al. | 385/133 |

FOREIGN PATENT DOCUMENTS

| | | |
|---|---|---|
| JP | 64-049017 | 2/1989 |
| JP | 07-098479 | 4/1995 |
| JP | 10-048746 | 2/1998 |
| JP | 11-142780 | 5/1999 |
| JP | 2001-013588 | 1/2001 |
| JP | 2003-15220 | 1/2003 |

* cited by examiner

*Primary Examiner*—Kevin S. Wood
(74) *Attorney, Agent, or Firm*—Crowell & Moring LLP (57) ABSTRACT

An image projector and a light tunnel are provided. The light tunnel includes: a light guide path in a form of a hollow tube having inner surfaces to reflect and guide light; a light entrance to allow light to enter the light guide path and a light exit to emit the light guided by the light guide path. The inner surfaces of the light guide path include inclined surfaces which are inclined in a manner that the aperture of the light guide path increases towards the light entrance. These inclined surfaces are connected to the light entrance. The aperture of the light entrance is larger than the aperture of the light exit. An image projector with this light tunnel allows more light to enter the light guide path than in the case of prior art, thereby decreasing light loss and increasing light quantity usable for image display.

3 Claims, 12 Drawing Sheets

Tunnel out

FIG. 5B

Tunnel out

FIG. 5C

| | |
|---|---|
| Calculation Results For Irradiance | |
| | Units: W/mm^2 |
| Number of Samples: 205335 | Maximum: 6.5459 |
| | Minimum: 4.8113 |
| | Average: 5.67942 |

FIG. 5D

| | | | | | | | | | | | |
|---|---|---|---|---|---|---|---|---|---|---|---|
| 79.19% | 80.04% | 80.04% | 81.90% | 88.88% | 84.95% | 84.50% | 85.08% | 73.50% | 91.04% | 87.36% | 79.05% | 90.04% |
| 89.78% | 91.92% | 92.54% | 80.86% | 83.38% | 90.59% | 91.61% | 88.86% | 92.20% | 88.76% | 89.29% | 98.52% | 84.16% |
| 84.29% | 78.74% | 83.82% | 100.00% | 78.13% | 85.93% | 82.43% | 90.12% | 95.29% | 84.01% | 85.19% | 89.44% | 83.36% |
| 83.14% | 80.30% | 86.24% | 84.26% | 86.62% | 93.19% | 98.27% | 86.96% | 81.54% | 84.89% | 86.43% | 84.20% | 78.45% |
| 81.11% | 92.83% | 89.38% | 92.67% | 86.87% | 77.38% | 81.96% | 78.26% | 80.74% | 82.03% | 81.55% | 84.55% | 81.72% |
| 82.34% | 87.86% | 93.04% | 83.45% | 84.23% | 83.81% | 93.63% | 87.26% | 88.85% | 87.95% | 90.78% | 92.41% | 79.96% |
| 80.97% | 82.45% | 95.87% | 84.95% | 89.77% | 91.87% | 84.48% | 93.15% | 92.35% | 79.21% | 89.89% | 93.89% | 80.12% |
| 85.25% | 92.02% | 88.95% | 88.32% | 89.26% | 84.60% | 90.24% | 84.04% | 93.14% | 87.50% | 92.99% | 85.82% | 91.26% |
| 86.90% | 90.62% | 86.72% | 89.38% | 88.07% | 90.86% | 91.89% | 91.64% | 91.68% | 85.48% | 82.58% | 91.97% | 92.03% |
| 86.01% | 82.25% | 87.75% | 86.84% | 79.04% | 82.25% | 86.90% | 91.03% | 87.89% | 90.36% | 88.69% | 92.08% | 81.36% |
| 78.31% | 89.64% | 87.71% | 86.65% | 85.28% | 86.38% | 87.25% | 88.71% | 92.77% | 87.28% | 79.60% | 87.86% | 78.97% |
| 87.22% | 85.06% | 89.33% | 86.98% | 84.66% | 93.25% | 87.86% | 90.21% | 83.85% | 84.38% | 93.21% | 96.69% | 86.29% |
| 91.80% | 87.16% | 83.92% | 76.75% | 82.81% | 94.34% | 86.50% | 82.32% | 88.18% | 90.46% | 81.53% | 79.36% | 87.87% |

Tunnel out

FIG. 6B

Tunnel out

FIG. 6C

| | |
|---|---|
| Calculation Results For Irradiance | |
| | Units: W/mm^2 |
| Number of Samples: 244758 | Maximum: 7.5096 |
| | Minimum: 5.4364 |
| | Average: 6.44094 |

FIG. 6D

| | | | | | | | | | | | |
|---|---|---|---|---|---|---|---|---|---|---|---|
| 76.46% | 79.85% | 78.05% | 82.30% | 77.89% | 82.62% | 78.49% | 83.92% | 81.60% | 87.23% | 81.89% | 85.53% | 84.70% |
| 87.90% | 77.30% | 93.54% | 84.57% | 91.65% | 100.00% | 96.29% | 89.27% | 81.72% | 79.97% | 85.82% | 90.34% | 77.80% |
| 83.99% | 88.25% | 85.34% | 93.31% | 88.66% | 90.17% | 87.02% | 91.37% | 88.73% | 88.46% | 79.57% | 82.88% | 86.15% |
| 86.79% | 85.23% | 83.77% | 91.46% | 82.79% | 83.75% | 88.00% | 94.06% | 86.25% | 90.18% | 88.87% | 91.64% | 82.52% |
| 82.98% | 80.02% | 83.68% | 93.60% | 89.34% | 82.14% | 95.32% | 87.19% | 83.71% | 89.98% | 91.92% | 84.42% | 75.94% |
| 78.03% | 84.58% | 93.98% | 81.36% | 85.70% | 87.25% | 92.23% | 89.59% | 87.48% | 88.62% | 82.90% | 79.28% | 80.89% |
| 79.72% | 84.64% | 85.94% | 82.08% | 87.10% | 90.79% | 84.16% | 90.70% | 86.82% | 93.07% | 87.07% | 87.14% | 79.93% |
| 81.23% | 83.57% | 85.68% | 89.52% | 92.03% | 90.34% | 77.64% | 91.66% | 84.28% | 94.14% | 77.78% | 87.44% | 73.27% |
| 81.56% | 88.04% | 88.67% | 90.51% | 91.55% | 87.25% | 92.19% | 82.21% | 78.56% | 82.67% | 84.46% | 95.90% | 85.54% |
| 73.01% | 87.51% | 82.72% | 97.12% | 84.05% | 88.04% | 87.78% | 85.78% | 91.14% | 92.95% | 86.45% | 88.89% | 83.71% |
| 84.61% | 83.87% | 89.23% | 97.71% | 78.29% | 92.39% | 86.52% | 83.01% | 88.73% | 82.14% | 84.35% | 88.39% | 81.83% |
| 85.78% | 84.71% | 92.28% | 79.53% | 94.12% | 83.72% | 85.07% | 87.31% | 85.11% | 92.04% | 81.14% | 89.07% | 81.93% |

```
            Calculation Results For Irradiance
                              Units: W/mm^2

Number of Samples: 245944     Maximum: 7.5094

Minimum: 5.404

Average: 6.42974
```

FIG. 7D

| 77.53% | 76.01% | 82.68% | 80.71% | 83.95% | 83.05% | 82.02% | 81.85% | 81.97% | 83.40% | 80.61% | 77.75% | 73.06% |
|---|---|---|---|---|---|---|---|---|---|---|---|---|
| 77.72% | 84.44% | 87.44% | 90.75% | 90.69% | 90.77% | 88.72% | 96.16% | 88.65% | 87.18% | 81.28% | 82.83% | 71.96% |
| 80.98% | 81.49% | 82.51% | 97.53% | 87.83% | 88.10% | 86.69% | 86.52% | 90.59% | 84.05% | 81.43% | 90.51% | 75.30% |
| 79.61% | 97.82% | 78.83% | 90.97% | 91.75% | 88.71% | 93.13% | 88.42% | 97.78% | 85.90% | 87.06% | 84.04% | 81.49% |
| 83.36% | 83.44% | 80.80% | 92.47% | 86.61% | 92.56% | 79.58% | 95.40% | 80.91% | 82.60% | 79.20% | 79.69% | 83.73% |
| 81.97% | 92.56% | 89.92% | 81.97% | 82.97% | 88.86% | 100.00% | 88.77% | 89.37% | 90.60% | 84.50% | 86.03% | 82.67% |
| 82.93% | 89.36% | 94.19% | 93.35% | 84.45% | 90.40% | 90.00% | 90.31% | 90.92% | 77.04% | 87.81% | 80.69% | 84.83% |
| 77.15% | 89.64% | 84.82% | 81.02% | 88.02% | 89.20% | 88.18% | 89.91% | 91.80% | 86.83% | 85.91% | 86.15% | 89.86% |
| 82.96% | 92.98% | 78.93% | 88.46% | 86.25% | 97.95% | 89.05% | 91.59% | 91.21% | 86.45% | 95.29% | 75.01% | 73.33% |
| 79.63% | 83.85% | 84.67% | 91.77% | 93.14% | 91.85% | 87.26% | 89.04% | 82.77% | 82.98% | 87.60% | 89.32% | 78.42% |
| 81.08% | 90.11% | 77.92% | 90.54% | 84.64% | 84.24% | 96.06% | 93.51% | 76.04% | 84.05% | 89.03% | 80.95% | 81.01% |
| 89.96% | 78.70% | 77.85% | 85.91% | 83.99% | 83.86% | 90.61% | 94.74% | 89.59% | 86.55% | 83.64% | 92.34% | 82.58% |
| 76.25% | 78.00% | 82.92% | 86.80% | 87.52% | 82.72% | 87.59% | 80.15% | 77.05% | 77.07% | 84.27% | 82.21% | 78.80% |

Tunnel out

FIG. 8B

Tunnel out

FIG. 8C

```
          Calculation Results For Irradiance
                                   Units: W/mm^2

Number of Samples: 180477        Maximum: 5.8105

Minimum: 4.4495

Average: 5.2342
```

FIG. 8D

| 91.83% | 88.27% | 84.69% | 88.90% | 83.89% | 83.28% | 80.92% | 91.28% | 95.12% | 95.40% | 86.76% |
|---|---|---|---|---|---|---|---|---|---|---|
| 91.55% | 95.55% | 87.15% | 91.26% | 89.49% | 94.30% | 85.83% | 86.79% | 92.47% | 91.80% | 87.12% |
| 93.10% | 94.05% | 88.07% | 85.21% | 95.49% | 96.93% | 91.84% | 90.42% | 93.54% | 87.64% | 86.79% |
| 90.19% | 87.68% | 94.19% | 86.35% | 86.20% | 84.91% | 94.58% | 92.67% | 89.01% | 93.61% | 93.10% |
| 92.57% | 88.37% | 93.49% | 87.77% | 88.96% | 86.37% | 82.57% | 96.22% | 96.57% | 89.45% | 99.99% |
| 88.26% | 90.64% | 84.20% | 94.97% | 88.11% | 92.44% | 87.27% | 92.53% | 90.84% | 91.27% | 89.63% |
| 88.98% | 87.14% | 92.16% | 90.33% | 93.16% | 89.63% | 90.10% | 91.85% | 76.58% | 89.92% | 89.36% |
| 79.87% | 94.15% | 87.37% | 95.03% | 89.46% | 92.30% | 85.46% | 93.38% | 92.91% | 89.32% | 88.83% |
| 96.20% | 96.90% | 90.92% | 100.00% | 90.06% | 89.84% | 96.04% | 92.23% | 89.20% | 83.16% | 88.40% |
| 95.67% | 85.62% | 80.87% | 86.02% | 92.89% | 89.25% | 97.84% | 94.88% | 94.35% | 89.64% | 93.71% |
| 84.49% | 85.25% | 98.67% | 91.81% | 88.32% | 87.93% | 84.57% | 89.09% | 87.17% | 89.83% | 80.08% |

Y ↑
  └─→ X

IMAGE PROJECTOR AND LIGHT TUNNEL

BACKGROUND OF THE INVENTION

1. Field of the Invention

The present invention relates to an image projector to project images onto a screen or the like, and also relates to a light tunnel.

2. Description of the Related Art

Conventionally, an image projector is known such that, based on image data from a personal computer, a video camera and the like, images are formed by an image forming element using light emitted from a lamp, and the formed images are projected onto a screen or the like for display. In this kind of image projector, a light tunnel is used to make uniform the light emitted from the lamp, and the uniformed light is guided to the image forming element to form images.

A light tunnel has a light guide path in a form of a tube having an internal hollow. One end of the light guide path is a light entrance, while the other end is a light exit. The light emitted from the lamp enters the light guide path from the light entrance, and is uniformed and guided by being repeatedly internally reflected on the inner surfaces of the tubular light guide path. The uniformed and guided light is emitted from the light exit.

Generally, in such light tunnel, four glass plates are joined to form a light guide path, a light entrance and a light exit, with an outer shape being approximately rectangular parallelepiped. Each of the light entrance and the light exit has an end having- an outer shape of a rectangle, and has an aperture having a shape of a rectangle as well which is smaller in size, by the thickness of each glass plate, than the outer shape of the corresponding end thereof. The aperture of the light entrance has a size the same as that of the light exit. The light guide path has an aperture having a shape of a rectangle as well which is the same in size as the aperture of each of the light entrance and the light exit, and which has a constant size from the light entrance to the light exit.

On the other hand, in an optical device of a rod type in which light entering its light entrance end face is totally reflected, guided to its light exit end face and emitted from the light exit end face, it is known to provide a taper portion having a cross-section which continuously increases from the light entrance end face to the light exit end face, thereby reducing the divergence angle of light or beam emitted from the light exit end face. (Refer to e.g. Japanese Laid-open Patent Publication Hei 11-142780.) Further, in a light tunnel of a pipe type in which light entering into its hollow portion from its light entrance end is reflected, guided and emitted from its light exit end, it is known to make the cross-section of the light entrance end smaller than the cross-section of the light exit end, thereby making the exit angle of the light from the light exit end smaller than the entrance angle of the light to the light entrance end. (Refer to e.g. Japanese Laid-open Patent Publication Hei 10-48746. Furthermore, in an optical device of a rod type in which light entering its light entrance end face is totally reflected, guided to its light exit end face and emitted from the light exit end face, it is known to design the light entrance end face to have a form of a cone, thereby increasing uniformity of illuminance on the light exit end face. (Refer to e.g. Japanese Laid-open Patent Publication Hei 7-98479.)

However, the above-described conventional light tunnel has a problem as follows. As described above, the aperture of the light entrance is smaller in size, by the thickness of each glass plate, than the outer shape of the end of the light entrance. Accordingly, the light emitted from the lamp and irradiated onto the light entrance end is partially irradiated onto the end faces of the glass plates. The light irradiated onto the end faces of the glass plates does not enter the light guide path. In other words, the light irradiated onto the light entrance end face of the light tunnel is partially lost by not being able to entirely enter the light guide path, more specifically by being partially irradiated onto the end faces of the glass plates.

Accordingly, in an image projector using a conventional light tunnel, there has been a problem that it is not possible to display images by sufficiently utilizing light from a lamp, because the light from the lamp is partially lost by being partially irradiated onto end faces of glass plates forming the light tunnel. Besides, this problem cannot be solved even by applying the technologies disclosed in the above-referred references.

SUMMARY OF THE INVENTION

An object of the present invention is to provide an image projector and a light tunnel in which light loss can be reduced, and light quantity usable for image display can be increased by introducing more light into a light guide path of a light tunnel.

This object is achieved according to a first aspect of the present invention by providing an image projector comprising: a lamp to emit light for image projection; a light tunnel comprising a light guide path which is formed of glass plates joined in a form of a tube having inner surfaces to reflect and guide light, and which comprises a light entrance, having an aperture, at one end thereof and a light exit, having an aperture, at the other end thereof, such that the light emitted from the lamp enters the light guide path from the light entrance, and is guided by the light guide path, and is further emitted from the light exit of the light tunnel; and an image forming element to form images using the light emitted from the light tunnel, the formed images being projected for display, wherein the inner surfaces of the light guide path comprise inclined surfaces inclined in a manner that aperture of the light guide path increases towards the light entrance, wherein the aperture of the light entrance is larger than the aperture of the light exit, wherein the light tunnel has an A value of substantially ⅙, where A is ratio 1/L assuming that the light tunnel has a total length of L, and each of the inclined surfaces in the light tunnel in a direction parallel to a light guide path has a length of 1, wherein the end of the light tunnel at the light entrance has an outer shape of a rectangle and has four corners having vertical surfaces that are vertical to the light guide path, the inclined surfaces of the light guide path being connected to the light entrance except the vertical surfaces, and wherein all the area of the end of the light tunnel at the light entrance except the vertical surfaces at the four corners is used as the light entrance.

In this configuration of image projector, due to the feature that the aperture of the light entrance is larger than the aperture of the light exit of the light tunnel, it becomes possible that the aperture of the light entrance is made larger than that in the case of prior art. Accordingly, more light from the lamp enters the light guide path of the light tunnel than in the case of prior art. The entering light is uniformed by being repeatedly reflected by the inner surfaces of the light guide path, and is emitted from the light exit. Thus, the light emitted from the light exit of the light tunnel becomes larger in its light quantity than in the case of prior art, and is formed by the image formed element into images, using more light than in the case of prior art, thereby realizing brighter and sharper images to be displayed.

Further, due to the feature that the light tunnel has an A value of substantially ⅙, where A is ratio 1/L assuming that the light tunnel has a total length of L, and each of the inclined surfaces in the light tunnel in a direction parallel to a light guide path has a length of 1, it becomes possible that the light entering the light entrance is made most uniform before being emitted from the light exit. Thus, images can be formed by the image forming element, using the more uniformed light, thereby realizing shaper images to be displayed.

Furthermore, due to the feature that the end of the light tunnel at the light entrance has four corners having vertical surfaces vertical to the light guide path, wherein the vertical surfaces are not inclined surfaces, it is made possible that these four corners function to increase strength of the light tunnel against external force, thereby preventing the light tunnel from damage by external loads such as contact, impact and pressure.

In addition, due to the feature that all the area of the end of the light tunnel at the light entrance except the vertical surfaces at the four corners is used as the light entrance, it is made possible that more light from the lamp is allowed to enter or introduced into the light guide path and is emitted from the light exit. Thus, images can be formed by the image formed element into images, using more light, thereby realizing brighter and sharper images to be displayed.

Besides, due to the feature that the light guide path of the light tunnel is formed of glass plates joined in a form of a tube, it is made possible that the light tunnel is easily manufactured, thereby enabling the reduction of cost.

The above-described object is achieved according to a second aspect of the present invention by providing a light tunnel comprising: a light guide path having a form of a hollow tube having inner surfaces to reflect and guide light; a light entrance, having an aperture, at one end of the light guide path to allow light to enter the light guide path; and a light exit, having an aperture, at the other end of the light guide path to emit the light guided by the light guide path, wherein the inner surfaces of the light guide path comprise inclined surfaces inclined in a manner that aperture of the light guide path increases towards the light entrance, the inclined surfaces of the light guide path being connected to the light entrance, and wherein the aperture of the light entrance is larger than the aperture of the light exit.

In this configuration of light tunnel, due to the feature that the aperture of the light entrance is larger than the aperture of the light exit, it becomes possible that the aperture of the light entrance is made larger than that in the case of prior art. Accordingly, more light from the lamp enters the light guide path of the light tunnel than in the case of prior art. More specifically, such portion of light as cannot be introduced into the light guide path in the case of prior art can be introduced into the light guide path, thereby reducing light loss and increasing light use efficiency. The light entering the light guide path is uniformed and guided by being repeatedly reflected by the inner surfaces of the light guide path, and is emitted from the light exit. Thus, the light emitted from the light exit of the light tunnel becomes larger in its light quantity than in the case of prior art.

Preferably, the light tunnel has an A value of substantially ⅙, where A is ratio 1/L assuming that the light tunnel has a total length of L, and each of the inclined surfaces in the light tunnel in a direction parallel to a light guide path has a length of 1. This makes it possible that the light emitted from the light exit is most uniform or much more uniform than similar light tunnels having A values or 1/L ratios different from the substantially ⅙, thereby improving light quality.

Further preferably, the light guide path of the light tunnel is formed of glass plates joined in a form of a tube, wherein the end of the tube at the light entrance has an outer shape of a rectangle and has four corners having vertical surfaces that are vertical to the light guide path, the inclined surfaces of the light guide path being connected to the light entrance except the vertical surfaces, and wherein all the area of the end of the light tunnel at the light entrance except the vertical surfaces at the four corners is used as the light entrance. Due to the feature that the light guide path of the light tunnel is formed of glass plates joined in a form of a tube, it is made possible that the light tunnel is easily manufactured, thereby enabling the reduction of cost.

Furthermore, due to the feature that the end of the light tunnel at the light entrance has four corners having vertical surfaces vertical to the light guide path, wherein the vertical surfaces are not inclined surfaces, it is made possible that these four corners function to increase strength of the light tunnel against external force, thereby preventing the light tunnel from damage by external loads such as contact, impact and pressure. In addition, due to the feature that all the area of the end of the light tunnel at the light entrance except the vertical surfaces at the four corners is used as the light entrance, it is made possible that more light from the lamp is allowed to enter or introduced into the light guide path and is emitted from the light exit, thereby further reducing light loss and further increasing light use efficiency.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 3A is a schematic perspective view of a light tunnel used in the same image projector, while

FIG. 5A and FIG. 5B are graphs, while

FIG. 6A and FIG. 6B are graphs, while

FIG. 7A and FIG. 7B are graphs, while FIG. 8A and FIG. 8B are graphs, while

DESCRIPTION OF THE PREFERRED EMBODIMENTS

An embodiment of the present invention will be described hereinafter with reference to the drawings.

Figure 1:
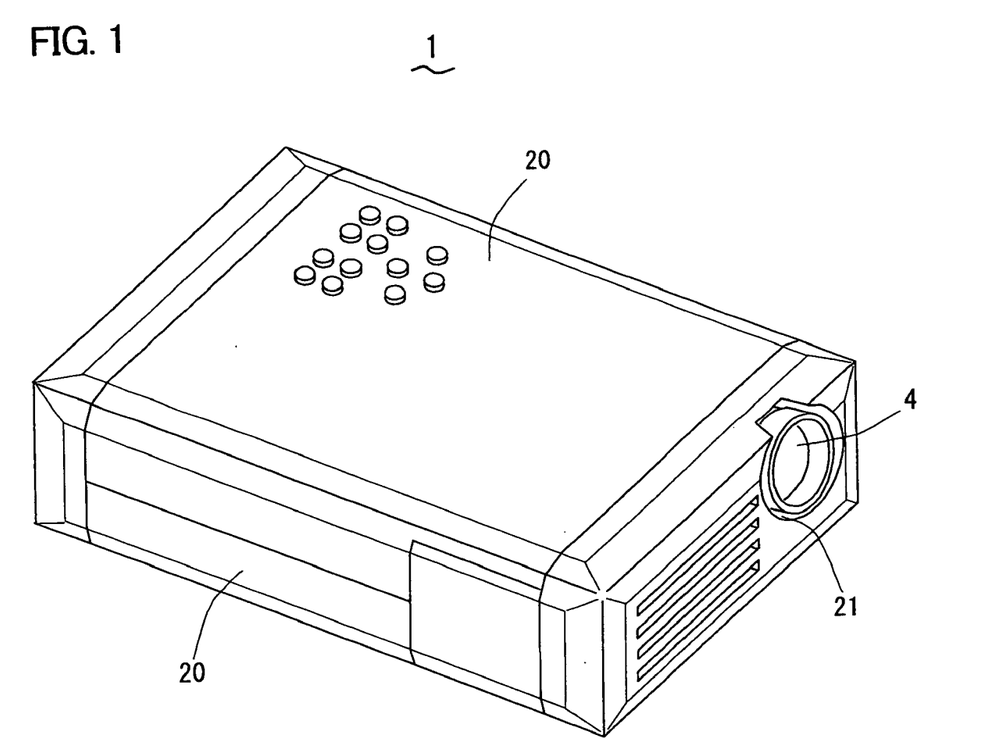
FIG. 1 is a schematic perspective view of an image projector according to an embodiment of the present invention.
Figure 2:
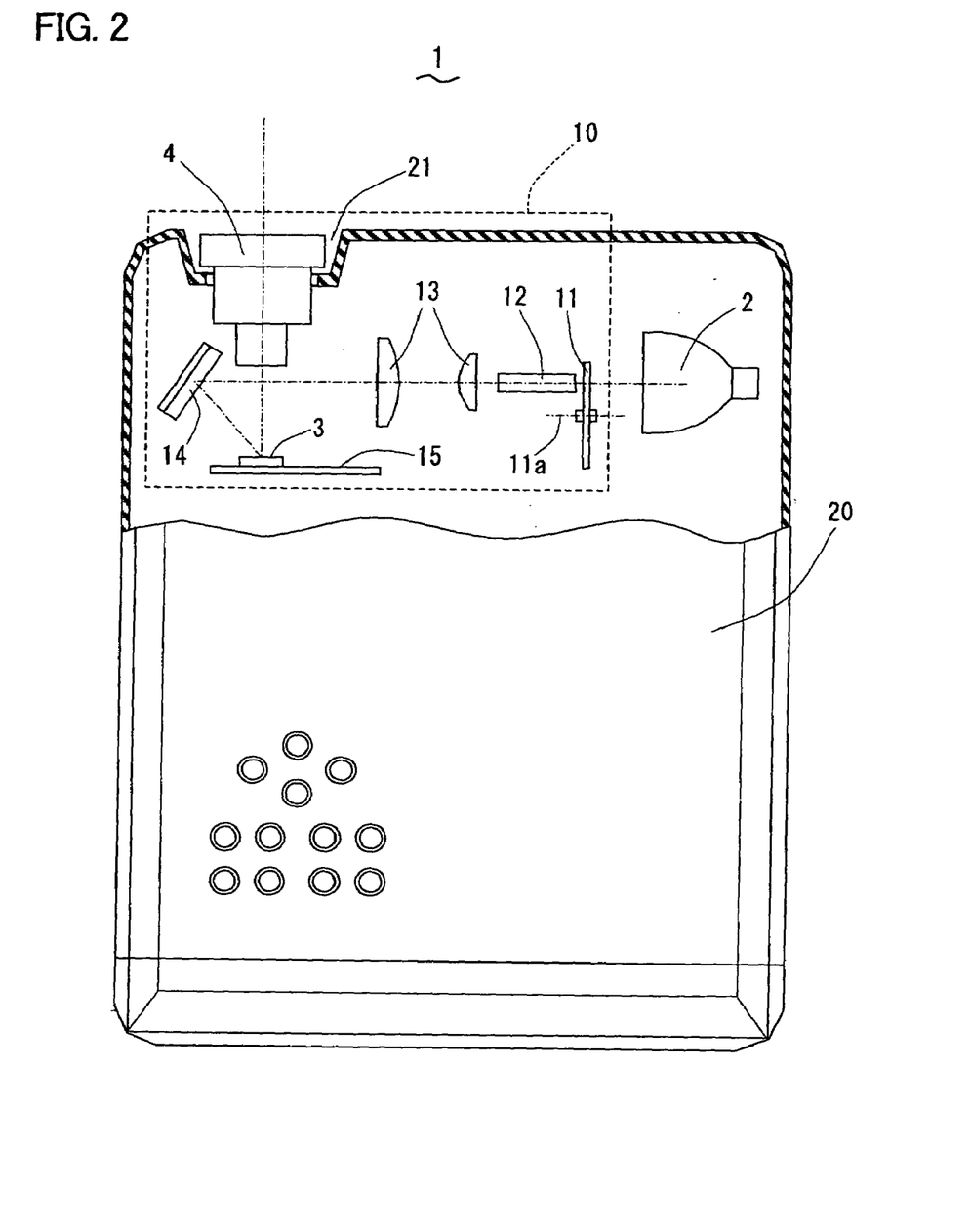
FIG. 2 is a schematic plan view of the same image projector, partially cut away, showing a configuration of an optical system used therein.

Referring to FIG. 1 and FIG. 2, an image projector 1 is an apparatus such that, based on image signals input from a personal computer, a video camera or the like, images are formed by an image forming element 3 using light emitted from a lamp 2, and that the formed images are projected from a projector lens 4 onto a screen or the like for display. This image projector 1 comprises: the lamp 2; an image projection optical system 10 including the image forming element 3 and the projector lens 4; and a housing 20 to contain these elements therein. The lamp 2 emits light for image projection, and the lamp 2 used here emits white light as an example. The image projection optical system 10 forms images and projects the formed images, using light from the lamp 2, and comprises a color filter 11, a light tunnel 12, a lens group 13 and a reflection mirror 14 in addition to the above-described image forming element 3 and the projection lens 4.

The image forming element 3 is an element to form images by reflecting light, and is placed on a circuit board 15. This image forming element 3 has an image forming surface formed of a lot of micro-mirrors arranged in a matrix form, wherein the tilt angle of each micro-mirror is controlled by control signals from a controller unit (not shown) so as to control the reflection angle of light irradiated onto the image forming surface (each micro-mirror), thereby forming images. The projection lens 4 projects light reflected by the image forming element 3, i.e. projects images formed by the image forming element 3, and is placed at the position of an image projection aperture 21 provided in the housing 20.

The color filter 11 colors the light emitted from the lamp 2. The color filter 11 rotates about a rotation axis 11a, and has four filters of red, green, blue and white (transparent) arranged in this order in the rotation direction. The light emitted from the lamp 2 is time-sequentially colored in the four colors of red, green, blue and white (transparent) by passing the rotating color filter 11.

The light tunnel 12 makes uniform the light having been colored by the color filter 11, and emits the uniformed light. Details of this light tunnel 12 will be described later. The lens group 13 focus the light, emitted from the light tunnel 12, onto the image forming element 3. The reflection mirror 14 reflects and brings the light output from the lens group 13 to the image forming element 3.

In the image projection optical system 10 having such configuration as described above, the light for image projection emitted from the lamp 2 is colored by the color filter 11, and is uniformed by the light tunnel 12. The uniformed light is reflected by the reflection mirror 14, and brought to the image forming element 3 so that the image forming element 3 forms images. The reflected light from the image forming element 3 (i.e. images formed by the image forming element 3) is projected onto a screen or the like via the projection lens 4.

Figure 3A:
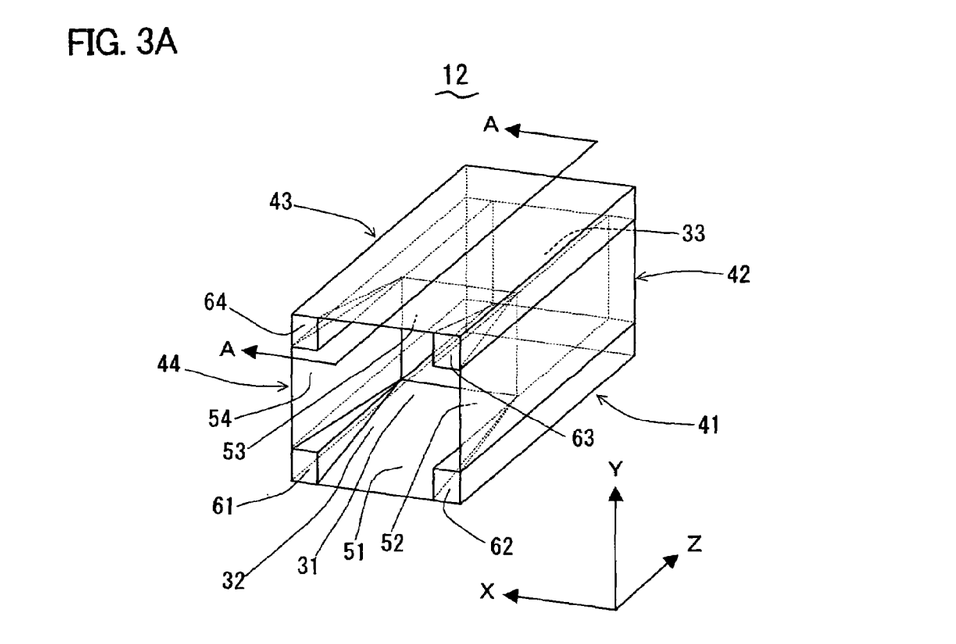
Figure 3B:
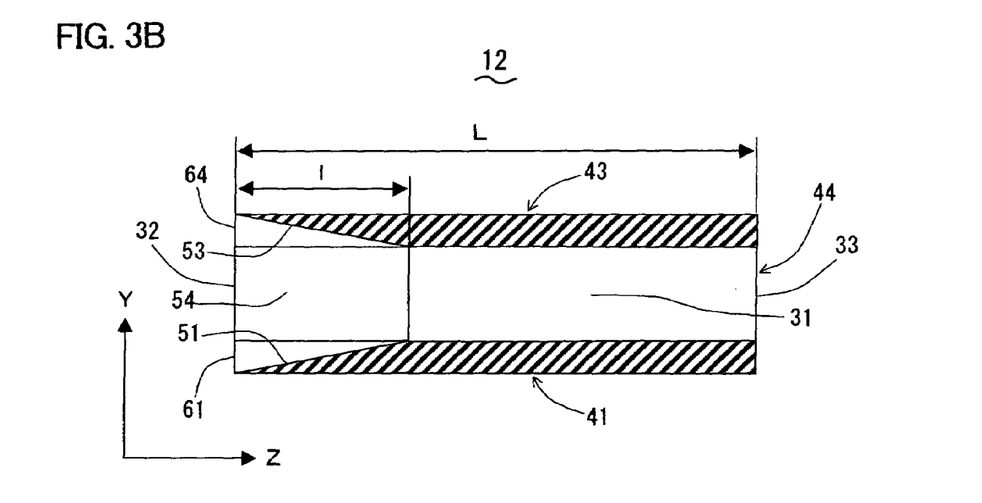
FIG. 3B is a schematic cross-sectional view taken along the line A—A of FIG. 3A.
Figure 4:
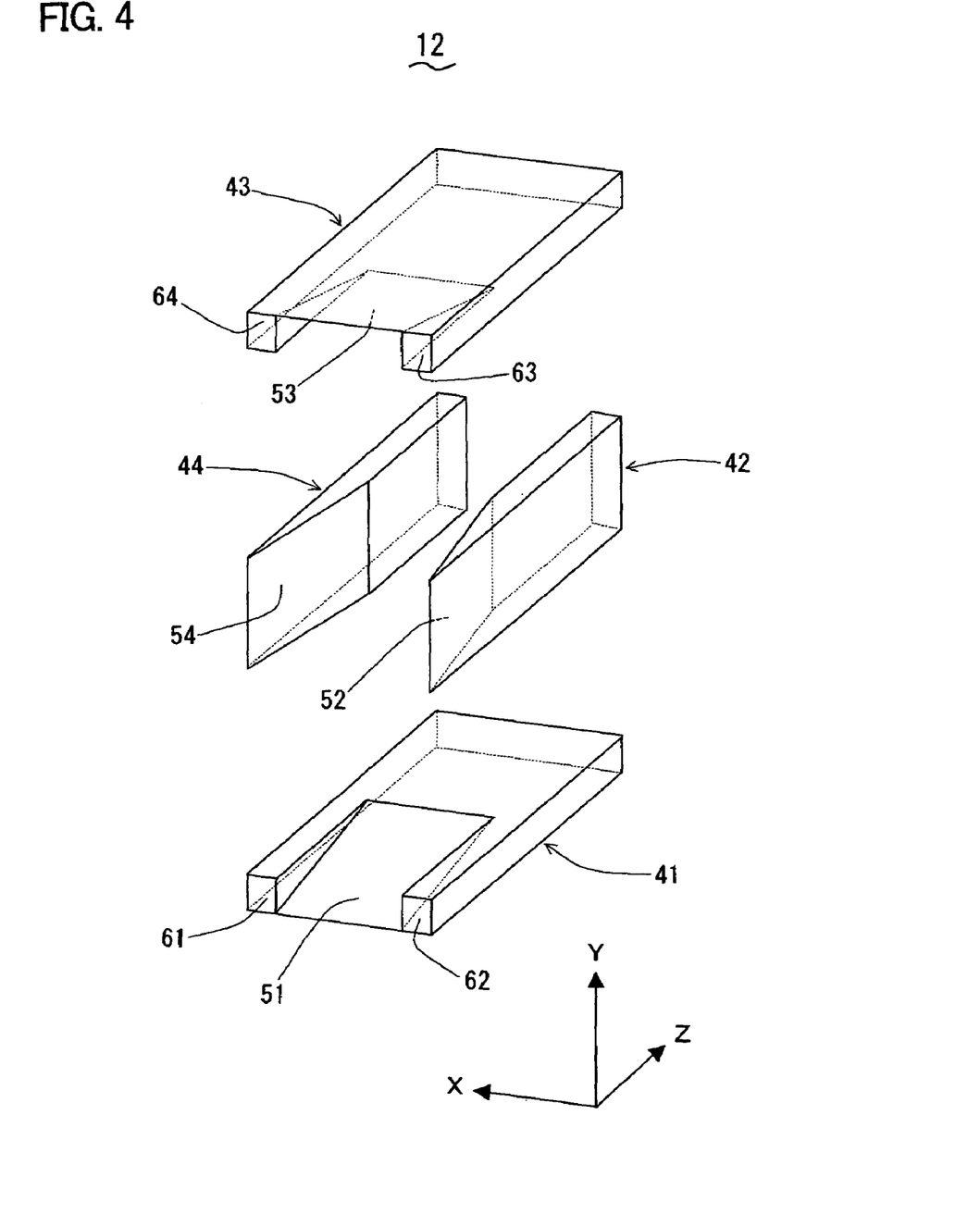
FIG. 4 is a schematic exploded perspective view of the same light tunnel.

In the following, the configuration of the above-described light tunnel 12 will be described with reference to FIG. 3A, FIG. 3B and FIG. 4. The light tunnel 12 comprises a light guide path 31, a light entrance 32 and a light exit 33. The light guide path 31 is a space to make uniform and guide light, and has a form of a hollow tube. The light entrance 32 is an aperture to allow light to enter the light guide path 31, and is provided at one end of the light guide path 31. The light exit 33 is an aperture to emit the light guided by the light guide path 31, and is provide at the other end of the light guide path 31.

This light tunnel 12 is formed of four glass plates 41, 42, 43 and 44 joined into a form of a hollow tube having apertures at both ends thereof. The hollow space inside the tube functions as the light guide path 31, wherein one of the apertures at one end functions as the light entrance 32, while the other one of the apertures at the other end functions as the light exit 33. The outer shape of the light tunnel 12 is approximately rectangular parallelepiped. The outer shape of the end of the light tunnel 12 at the light entrance 32 has a size and a shape of a rectangle that are the same as those of the outer shape of the other end of the light tunnel 12 at the light exit 33.

Inner surfaces of the light guide path 31 comprise inclined surfaces 51, 52, 53 and 54 that are inclined relative to the direction (Z-direction) of the light guide path 31. The inclined surfaces 51, 52, 53 and 54 are inclined in a manner that the aperture of the light guide path 31 increases towards the light entrance 32, and are connected to the light entrance 32. These inclined surfaces 51, 52, 53 and 54 are formed by decreasing the thicknesses of the glass plates 41, 42, 43 and 44 towards the light entrance 32.

Four corners at the end of the light tunnel 12, at the light entrance 32, have vertical surfaces 61, 62, 63 and 64 that are vertical to the light guide path 31. The vertical surfaces 61 and 62 are end faces of the glass plate 41, while the vertical surfaces 63 and 64 are end faces of the glass plate 43. The inclined surfaces 51, 52, 53 and 54 are connected to the light entrance 32 except these vertical surfaces 61, 62, 63 and 64. Each of the glass plates 41, 42, 43 and 44 is formed to be as thin as possible at the end of each of the inclined surfaces 51, 52, 53 and 54 at the light entrance 32. Thus, the shape of the aperture of the light entrance 32 is the outer shape of the light tunnel 12 at the light entrance 32 minus the vertical surfaces 61, 62, 63 and 64.

The glass plates 41, 42, 43 and 44 each have a constant thickness except for the locations of the inclined surfaces 51, 52, 53 and 54 thereof. Thus, the shape of the aperture of the light exit 33 is the outer shape of the light tunnel 12 at the light exit 32 minus the thicknesses of the end faces of the glass plates 41, 42, 43 and 44. The aperture of the light guide path 31 increases towards the light entrance 32 at the locations of the inclined surfaces 51, 52, 53 and 54, and is constant at the other locations. The aperture of the light entrance 32 is larger than the aperture of the light exit 33 by the amount of increment of the aperture of the light guide path 31 due to the inclined surfaces 51, 52, 53 and 54.

In the light tunnel 12 having such configuration as described above, most of light from the lamp 2 irradiated onto the end, at the light entrance 32, of the light tunnel enters the light guide path 31 from the light entrance 32, while the remaining portion of the light is irradiated onto the vertical surfaces 61, 62, 63 and 64. Here, the inclined surfaces 51, 52, 53 and 54 function as reflecting surfaces to reflect and guide the light, entering the light guide path 31, to the light exit 33. Besides, the vertical surfaces 61, 62, 63 and 64 function as transmitting surfaces to transmit the light from the lamp 2.

The light entering the light guide path 31 is uniformed and guided by being repeatedly reflected by the inner surfaces of the light guide path 31 (including the inclined surfaces 51, 52, 53 and 54), and is then emitted from the light exit 33. Since the aperture of the light entrance 32 is larger than the aperture of the light exit 33 in the light tunnel 12, more light enters the light guide path 31 than in the case of the conventional configuration, in which the aperture of the light entrance is the same as the aperture of the light exit. Accordingly, more light than in the case of the conventional configuration is uniformed by the light guide path 31 and emitted from the light exit 33.

It is easy to manufacture the light tunnel 12 because it is formed of the glass plates 41, 42, 43 and 44 joined into a form of a tube, whereby the inner space of the tube is used as the light guide path 31. Furthermore, the light tunnel 12 can have an increased strength against external force because the four corners of the end of the light entrance 32 do not have the inclined surfaces 51, 52, 53 and 54, but has the vertical surfaces 61, 62, 63 and 64 formed thereat (thus the glass plates 41, 42, 43 and 44 are not thinned at the four corners). Moreover, all the area of the end of the light tunnel 12 except the vertical surfaces 61, 62, 63 and 64 at the four corners is used as the light entrance 32, so that more light enters the light guide path 31, whereby more light is uniformed by the light guide path 31 and is emitted from the light exit 33.

Hereinafter, results of ray tracing simulations to which the above-described light tunnel 12 was subjected will be described. Ray tracing simulations by emitting 500,000 rays from the lamp 2 to the light entrance 32 of the light tunnel 12 and by tracing the rays were performed in the cases of A=1/15, A=1/6 and A=1/3, where A is ratio 1/L assuming that the total length of the light guide length 31 of the light tunnel 12 is L, and the length of each of the inclined surfaces 51, 52, 53 and 54 in the direction (Z-direction) parallel to the light guide path 31 is 1. Likewise, similar ray tracing simulations were performed in the case of A=0 (that corresponds to the conventional light tunnel).

Figure 5A:
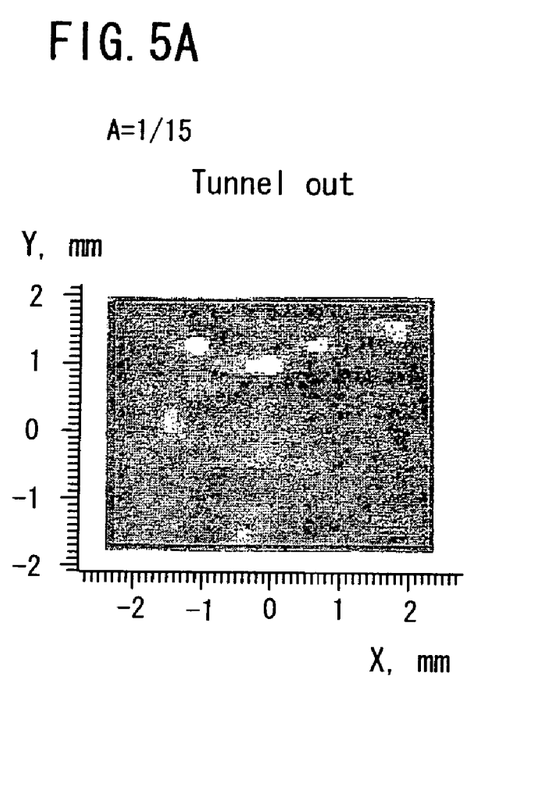
Figure 5B:
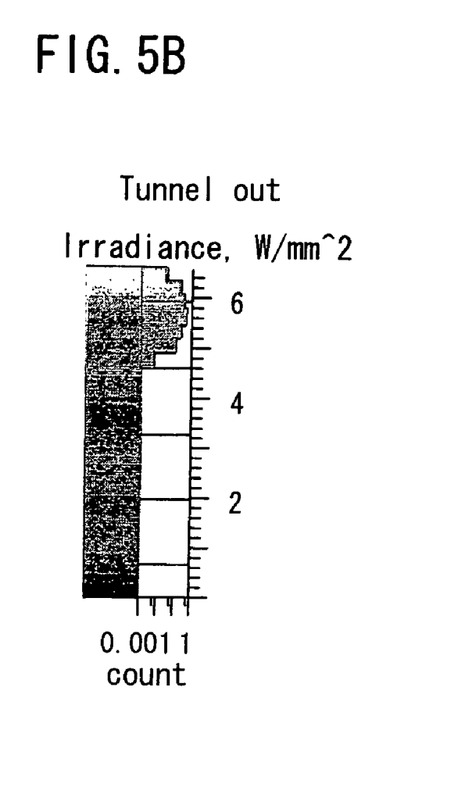

Firstly, the results of ray tracing simulations in the case of A=1/15 are shown in FIG. 5A, FIG. 5B, FIG. 5C and FIG. 5D. FIG. 5A is a graph showing irradiance distribution at the light exit 33 of the light tunnel 12. The horizontal axis and the vertical axis of FIG. 5A show coordinate positions in the X-direction and the Y-direction (refer to FIG. 3A and FIG. 3B), respectively, wherein lighter color indicates higher irradiance, and darker color indicates lower irradiance. FIG. 5B is a graph showing relationship between irradiance of each individual ray emitted from the light exit 33 and count of rays having the same irradiance, wherein the vertical axis shows irradiance of each ray, and the horizontal axis shows count of rays having the same irradiance.

Figure 5C:
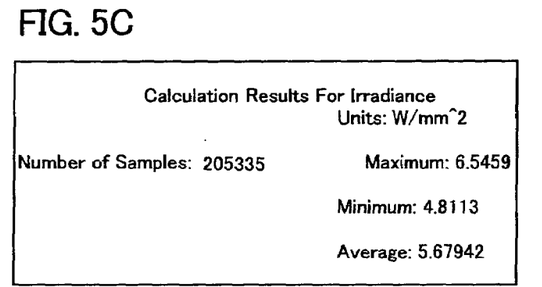
FIG. 5C and FIG. 5D are data charts, showing results of ray tracing simulations to which the same light tunnel was subjected in the case of A=1/15, where A is ratio 1/L assuming that the light tunnel has a total length of L, and each of the inclined surfaces in the light tunnel in a direction parallel to a light guide path has a length of 1.

FIG. 5C is a data chart showing number of samples emitted from the light exit 33 as well as maximum, minimum and average of the irradiance of such rays. It shows that the number of samples emitted from the light exit 33 was 205,335, while the maximum, the minimum and the average of the irradiance of such rays were 6.5459 (W/mm$^2$), 4.8113 (W/mm$^2$), and 5.67942 (W/mm$^2$), respectively.

Figure 5D:
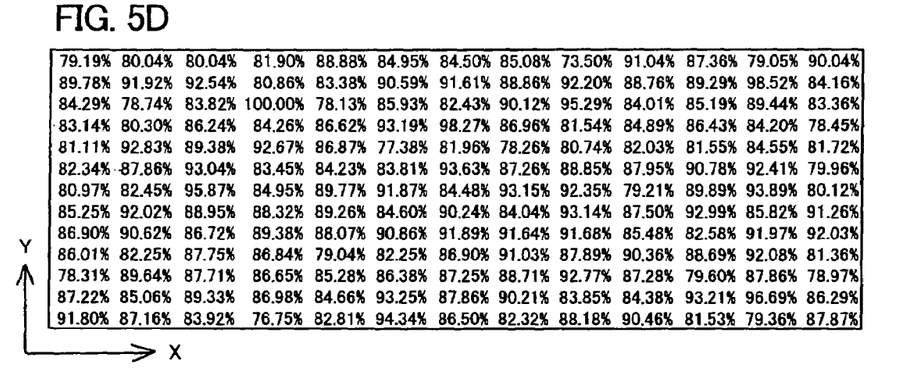

FIG. 5D is a data chart showing the irradiance distribution, at the light exit 33, having been numerically expressed by dividing the light exit 33 into 13 areas in each of the X-direction and the Y-direction (169 divided areas in total), and by numerically expressing irradiance sum in each divided area. It is to be noted here that the largest irradiance sum in one divided area among all the divided areas is numerically expressed as 100%, while the other irradiance sums in the other divided areas are numerically expressed relative thereto.

Figure 6A:
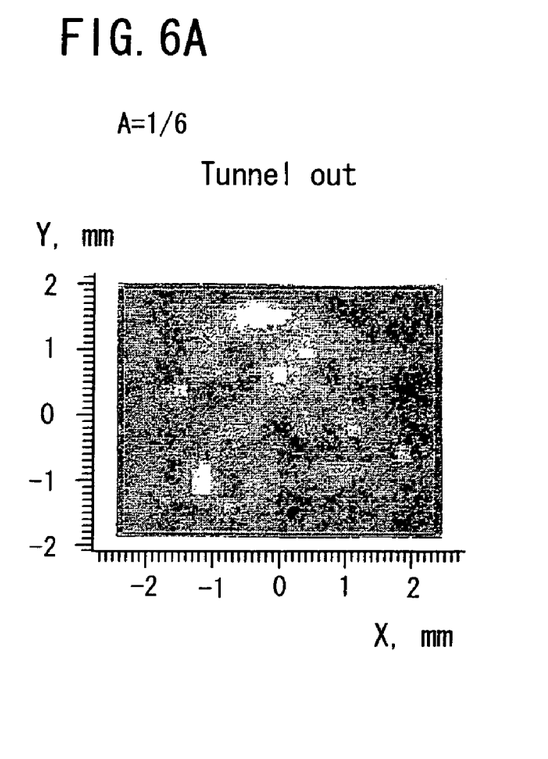
Figure 6B:
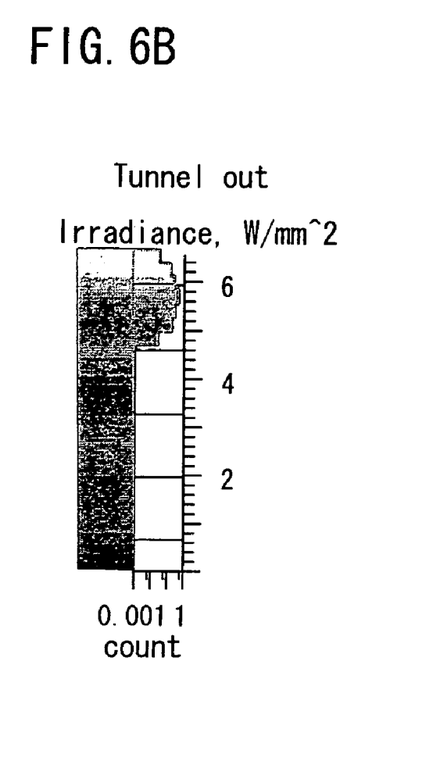
Figure 6C:
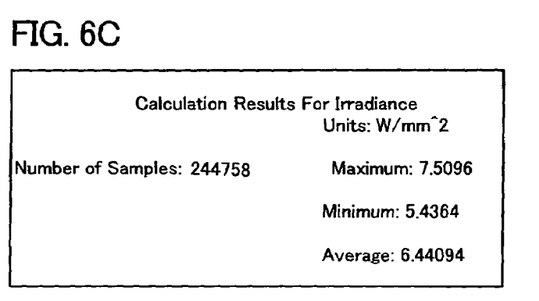
FIG. 6C and FIG. 6D are data charts, showing results of ray tracing simulations similar to those in FIG. 5A to FIG. 5D, except that here A=⅙.
Figure 6D:
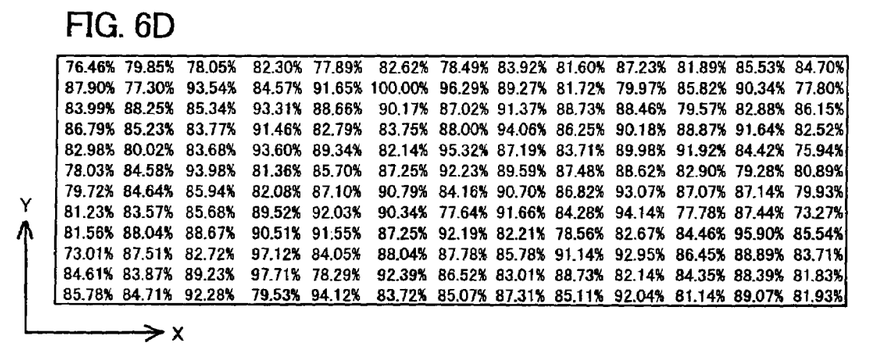

Next, the results of ray tracing simulations in the case of A=1/6 are shown in FIG. 6A, FIG. 6B, FIG. 6C and FIG. 6D. Similarly as in FIG. 5A, FIG. 6A is a graph showing irradiance distribution at the light exit 33 of the light tunnel 12. Similarly as in FIG. 5B, FIG. 6B is a graph showing relationship between irradiance of each individual ray emitted from the light exit 33 and count of rays having the same irradiance. Similarly as in FIG. 5C, FIG. 6C is a data chart showing number of samples emitted from the light exit 33 as well as maximum, minimum and average of the irradiance of such rays. It shows that the number of samples emitted from the light exit 33 was 244,758, while the maximum, the minimum and the average of the irradiance of such rays were 7.5096 (W/mm$^2$), 5.4364 (W/mm$^2$), and 6.44094 (W/mm$^2$), respectively. Similarly as in FIG. 5D, FIG. 6D is a data chart showing the numerically expressed irradiance distribution at the light exit 33, except that here the light exit 33 is divided into 13 areas in the X-direction and 12 areas in the Y-direction (156 divided areas in total).

Figure 7A:
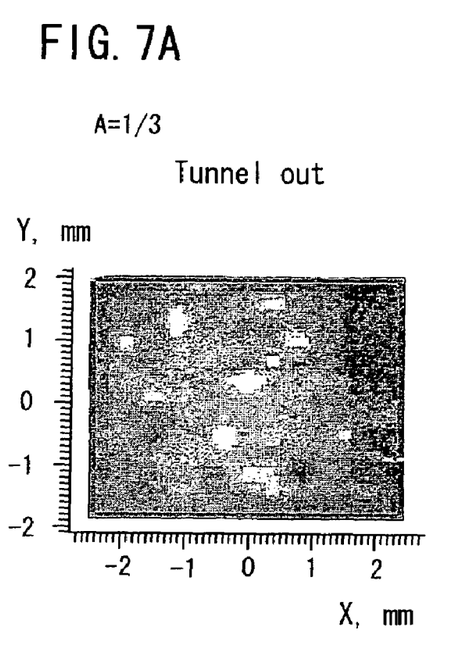
Figure 7B:
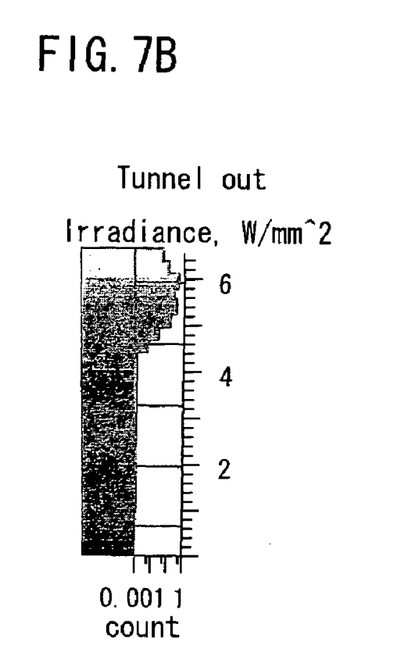
Figure 7C:
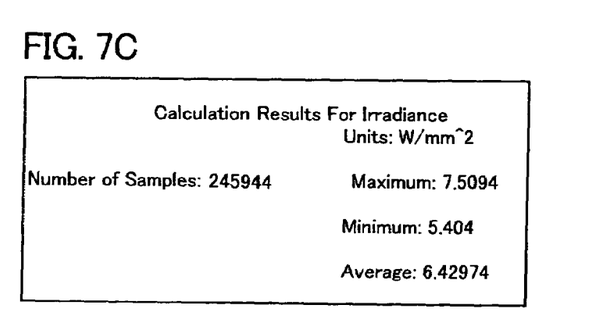
FIG. 7C and FIG. 7D are data charts, showing results of ray tracing simulations similar to those in FIG. 5A to FIG. 5D, except that here A=⅓.
Figure 7D:
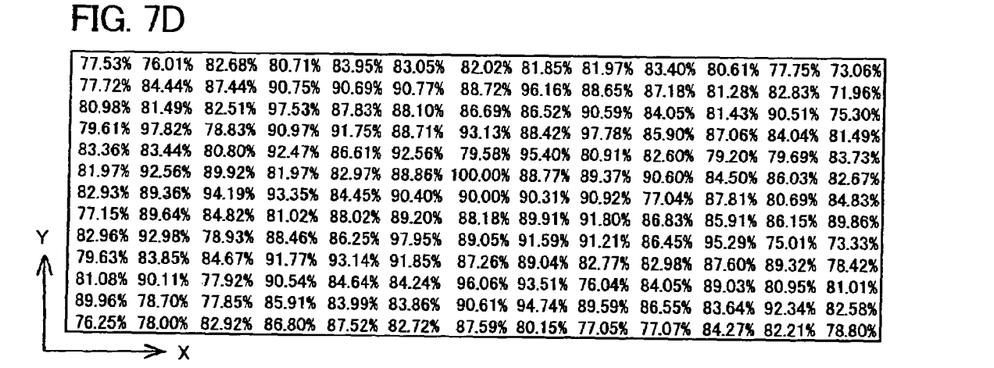

Further, the results of ray tracing simulations in the case of A=1/3 are shown in FIG. 7A, FIG. 7B, FIG. 7C and FIG. 7D. Similarly as in FIG. 5A, FIG. 7A is a graph showing irradiance distribution at the light exit 33 of the light tunnel 12. Similarly as in FIG. 5B, FIG. 7B is a graph showing relationship between irradiance of each individual ray emitted from the light exit 33 and count of rays having the same irradiance. Similarly as in FIG. 5C, FIG. 7C is a data chart showing number of samples emitted from the light exit 33 as well as maximum, minimum and average of the irradiance of such rays. It shows that the number of samples emitted from the light exit 33 was 245,944, while the maximum, the minimum and the average of the irradiance of such rays were 7.5094 (W/mm$^2$), 5.404 (W/mm$^2$), and 6.42974 (W/mm$^2$), respectively. Similarly as in FIG. 5D, FIG. 7D is a data chart showing the numerically expressed irradiance distribution at the light exit 33.

Figure 8A:
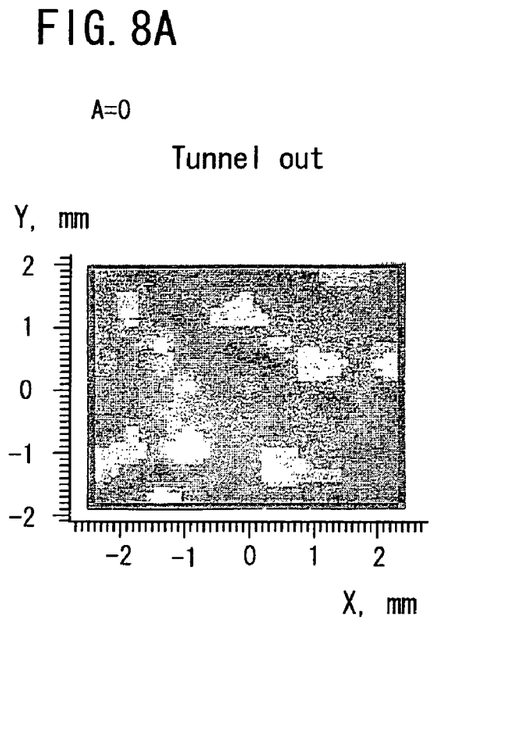
Figure 8B:
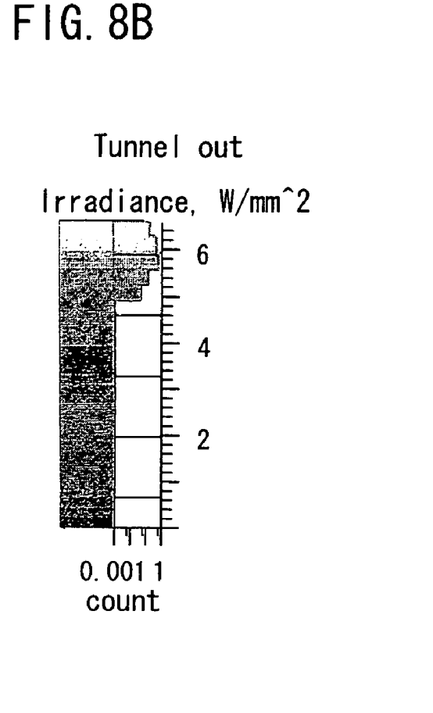
Figure 8C:
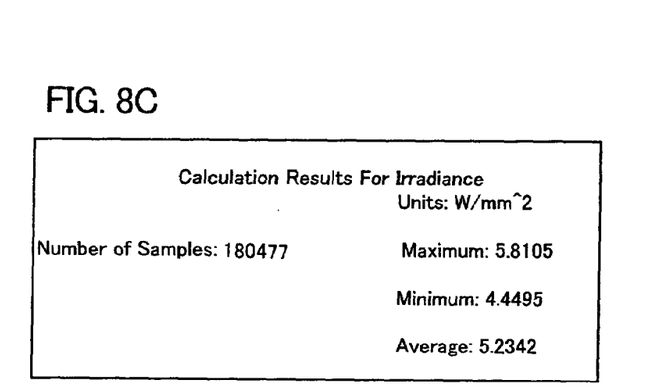
FIG. 8C and FIG. 8D are data charts, showing results of ray tracing simulations similar to those in FIG. 5A to FIG. 5D, except that here A=0 (that corresponds to the conventional light tunnel).
Figure 8D:
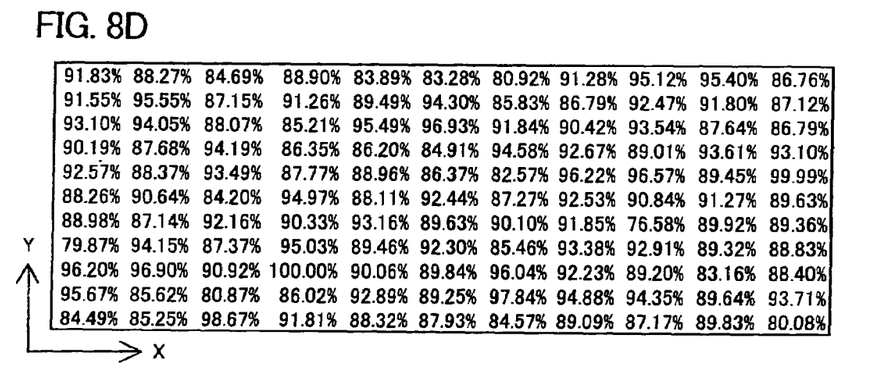

Lastly, the results of ray tracing simulations in the case of A=0 (the conventional light tunnel) are shown in FIG. 8A, FIG. 8B, FIG. 8C and FIG. 8D. Similarly as in FIG. 5A, FIG. 8A is a graph showing irradiance distribution at the light exit of the light tunnel. Similarly as in FIG. 5B, FIG. 8B is a graph showing relationship between irradiance of each individual ray emitted from the light exit and count of rays having the same irradiance. Similarly as in FIG. 5C, FIG. 8C is a data chart showing number of emitted samples as well as maximum, minimum and average of the irradiance of such rays. It shows that the number of emitted samples was 180,477, while the maximum, the minimum and the average of irradiance of such rays were 5.8105 (W/mm$^2$), 4.4495 (W/mm$^2$), and 5.8105 (W/mm$^2$), respectively. Similarly as in FIG. 5D, FIG. 8D is a data chart showing the numerically expressed irradiance distribution at the light exit, except that here the light exit is divided into 11 areas in each of the X-direction and the Y-direction (121 divided areas in total).

Comparing the case of A=0 (the conventional light tunnel) with the cases of A=1/15, A=1/6 and A=1/3, it is evident that the irradiance sum at the light exit 33 (that is light quantity emitted from the light exit 33) in the case where the A value is substantially equal to 1/15, 1/6 or 1/3 is larger than that in the case where the A value is 0. (It is to be noted that the irradiance sum at the light exit 33 can be obtained as a product of number of samples emitted from the light exit 33 and average of irradiance of such rays.) It is further evident that the case where the A value is substantially equal to 1/6 is the best among the above cases as to balance of irradiance sum and the irradiance distribution (namely uniformity of light). (It is to be noted that the term "substantially equal to" as used in the present specification means "equal to or approximately equal to").

According to such image projector 1 comprising such light tunnel 12 (i.e. light tunnel 12 comprising the inclined surfaces 51, 52, 53 and 54 and having the light entrance 32, which has an aperture larger than that of the light exit 33), more light is emitted from the light tunnel 12 than in the case of the conventional light tunnel, so that the image forming element 3 forms images using more light, thereby displaying brighter and sharper images. Further, using the light tunnel 12 of the A value of substantially 1/6, the most uniformed light is emitted from the light tunnel 12, so that images of more uniformed light are formed, whereby sharp images without spottiness can be displayed.

It is to be noted here that the present invention is not limited to such specific embodiments as described above, and various modifications are possible. For example, the light tunnel 12 is not necessarily limited to such configuration formed by joining the glass plates 41, 42, 43 and 44 in a form of a tube, but can be a configuration such that a metal plate is bent into a form of a tube. Furthermore, the light tunnel 12 can be used for various other optical devices, not limited to the image projector 1.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A light tunnel comprising:
   a light guide path having a form of a hollow tube having inner surfaces to reflect and guide light;
   a light entrance, having an aperture, at one end of the light guide path to allow light to enter the light guide path; and
   a light exit, having an aperture, at the other end of the light guide path to emit the light guided by the light guide path,
   wherein of the inner surfaces of the light guide path comprise inclined surfaces inclined in a manner that aperture of the light guide path increases towards the light entrance, the inclined surfaces of the light guide path being connected to the light entrance,
   wherein the aperture of the light entrance is larger than the aperture of the light exit; and
   wherein the light tunnel has an A value of substantially 1/6, where A is ratio 1/L assuming that the light tunnel has a total length of L, and each of the inclined surfaces in the light tunnel in a direction parallel to a light guide path has a length of 1.

2. The light tunnel according to claim 1,
   wherein the light guide path is formed of glass plates joined in a form of a tube,
   wherein the end of the tube at the light entrance has an outer shape of a rectangle and has four corners having vertical surfaces that are vertical to the light guide path, the inclined surfaces of the light guide path being connected to the light entrance except the vertical surfaces, and
   wherein all the area of the end of the light tunnel at the light entrance except the vertical surfaces at the four corners is used as the light entrance.

3. An image projector comprising:
   a lamp to emit light for image projection;
   a light tunnel comprising a light guide path which is formed of glass plates joined in a form of a tube having inner surfaces to reflect and guide light, and which comprises a light entrance, having an aperture, at one end thereof and a light exit, having an aperture, at the other end thereof, such that the light emitted from the lamp enters the light guide path from the light entrance, and is guided by the light guide path, and is further emitted from the light exit of the light tunnel; and
   an image forming element to form images using the light emitted from the light tunnel, the formed images being projected for display,
   wherein the inner surfaces of the light guide path comprise inclined surfaces inclined in a manner that aperture of the light guide path increases towards the light entrance,
   wherein the aperture of the light entrance is larger than the aperture of the light exit,
   wherein the light tunnel has an A value of substantially 1/6, where A is ratio 1/L assuming that the light tunnel has a total length of L, and each of the inclined surfaces in the light tunnel in a direction parallel to a light guide path has a length of 1,
   wherein the end of the light tunnel at the light entrance has an outer shape of a rectangle and has four corners having vertical surfaces that are vertical to the light guide path, the inclined surfaces of the light guide path being connected to the light entrance except the vertical surfaces, and
   wherein all the area of the end of the light tunnel at the light entrance except the vertical surfaces at the four corners is used as the light entrance.

* * * * *